United States Patent Office 3,116,285
Patented Dec. 31, 1963

3,116,285
NOVEL PENICILLIN COMPOUNDS
Walter D. Celmer, New London, and Donald C. Hobbs, East Lyme, Conn., assignors to Chas. Pfizer & Co., Inc., New York, N.Y., a corporation of Delaware
No Drawing. Filed May 25, 1960, Ser. No. 31,563
8 Claims. (Cl. 260—239.1)

This invention relates to new antibiotic compounds and their salts and, more particularly, to novel 6-aminopenicillanic acid derivatives and their salts which show resistance to penicillinase.

The term "penicillin" includes a number of acyl derivatives of 6-aminopenicillanic acid which differ only in the nature of the R' group and possess the general formula

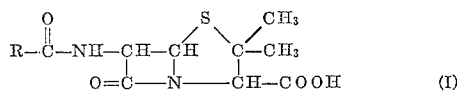

in which the acyl moiety is derived from a carboxylic acid.

The properties of a particular penicillin are determined by the R group. The best known and most widely used penicillins are benzylpenicillin and phenoxymethylpenicillin wherein R (Formula I) represents the benzyl- and phenoxymethyl-radicals. Both compounds are effective via both parenteral and oral administration in the treatment of bacterial infections due to gram-positive organisms but are generally ineffective against gram-negative organisms, many of which are resistant to their action, and against penicillinase producing strains of bacteria, such as *Bacillus subtilis, Bacillus cereus* and various Staphylococci strains. The penicillinases produced by these bacteria antagonize the antibacterial activity of the penicillin compound by hydrolysis of the beta lactam linkage to produce a biologically inactive penicilloic acid. It is a prominent factor in penicillin resistance of bacteria.

There has now been discovered a series of novel and valuable derivatives of 6-aminopenicillanic acid, hereinafter referred to as α-phenoxy-β-hydroxyalkyl penicillins and α-phenylmercapto-β-hydroxyalkylpenicillins, and acyl derivatives thereof, which possess significant activity against gram positive organisms and which are unexpectedly resistant to the effect of penicillinases and, therefore, of value in the treatment of bacterial infections due to certain penicillinase-producing organisms resistant to the presently available penicillins. The novel compounds of this invention have, in the acid form, the formula:

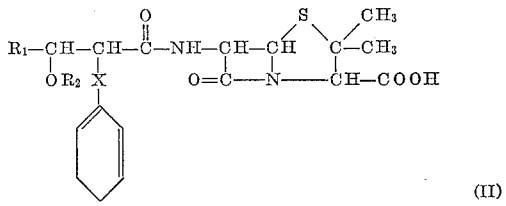

wherein X is selected from the group consisting of oxygen and sulfur; $R_1$ is selected from the group consisting of alkyl containing 1 to 5 carbon atoms and hydrogen; and $R_2$ is selected from the group consisting of hydrogen and acyl radical of a hydrocarbon monocarboxylic acid containing 1 to 4 carbon atoms. These novel compounds can, by virtue of the asymmetric center or centers present in the side chain, exist in diastereoisomeric forms, and mixtures thereof, derived respectively from the isomeric precursor acids. When the *dl*-precursor acid is used, a mixture of the diastereoisomers will be produced. When $R_1$ is other than hydrogen two dissimilar asymmetric carbon atoms are present in the side chain of these novel compounds giving rise to the existence of additional diastereoisomeric forms derived respectively from the corresponding precursor acids. Therefore, included within the purview of this invention are the various stereosiomeric modifications and mixtures thereof, of the compounds of Formula II above, all of which exhibit substantial therapeutic activity.

Included in the present invention are the pharmaceutically acceptable salts of these novel and valuable penicillins, that is, non-toxic metal salts such as the sodium, calcium and potassium salts, and non-toxic ammonium and substituted ammonium salts, for example, salts of such non-toxic amines as procaine, dibenzylamine, N,N'-bis(dehydroabietyl)ethylenediamine, N,N'-dibenzylethylenediamine, 1-ephenamine, N-benzyl-β-phenethylamine, 1-methylpentylamine, 4,4'-dimethylbenzhydrylamine and other amines which have been used to form salts with benzylpenicillin.

In addition to their resistance to penicillinase and their significant antagonism toward organisms resistant to the heretofore available penicillins, the valuable products of this invention also demonstrate antagonism toward gram-positive organisms although the activity towards the latter is somewhat lower than that of phenoxymethylpenicillin. The compounds of this invention wherein $R_2$ is acyl exhibit no activity against the resistant Staphylococci in vitro. The antibacterial spectrum (in vitro) of α-phenoxy-β-hydroxyethylpenicillin, and α-phenoxy-β-acetoxyethylpenicillin versus a number of gram-positive and gram-negative organisms are compared with that of phenoxymethylpenicillin in Table I. All compounds are used as their potassium salts.

TABLE I

*Antibacterial Spectra of the Potassium Salts of α-Phenoxy-β-Hydroxyethylpenicillin (A), α-Phenoxy-β-Acetoxyethylpenicillin (B) and Phenoxymethylpenicillin (C)*

| Microorganism | MIC mcg./ml. (A) | (B) | (C) |
|---|---|---|---|
| *Staphylococcus aureus* | 0.0625 | 0.19 | 0.0312 |
| *Staphylococcus aureus 376* | 50 | >100 | >100 |
| *Staphylococcus aureus 400* | 50 | >100 | >100 |
| *Streptococcus pyogenes* | 0.0078 | 0.04 | 0.0156 |
| *Streptococcus faecalis* | 0.39 | 1.56 | 0.156 |
| *Diplococcus pneumoniae* | 1.56; 0.78 pi | 1.56 | 0.156 |
| *Corynebacterium diphtheriae* | 0.25; 0.1 pi | 0.39 | 0.78 |
| *Listeria monocytogenes* | 0.19 | 0.78 | 6.25 |
| *Bacillus subtilis* | 0.125 | 0.78 | 0.019 |
| *Streptococcus agalactiae* | 0.0312 | 0.09 | 0.039 |
| *Lactobacillus casei* | 1.56; 0.78 pi | 3.12 | 1.56 |
| *Bacterium ammoniagenes* | 3.12; 1.56 pi | 0.39 | 0.039 |
| *Aerobacter aerogenes* | 25 | >100 | >100 |
| *Escherichia coli* | 50 | >100 | >100 |
| *Proteus vulgaris* | 50 | >100 | >100 |
| *Pseudomonas aeruginosa* | 100; 50 pi | >100 | >100 |
| *Salmonella typhosa* | 50 | >100 | >100 |
| *Salmonella gallinarum* | 100 | | >100 |
| *Salmonella pullorum* | 50 | >100 | >100 |
| *Klebsiella pneumoniae* | 50 | >100 | 100 |
| *Neisseria gonorrhoeae* | 1.56; 0.78 pi | 1.56 | |
| *Hemophilus pertussis* | 1.56 | 3.12 | 12.5 |
| *Shigella sonnei* | 50 | >100 | >100 |
| *Brucella bronchiseptica* | >100 | >100 | >100 |
| *Malleomyces mallei* | >100 | >100 | >100 |
| *Vibrio comma* | 12.5; 6.25 pi | 25 | 12.5 |
| *Pasteurella multocida* | 0.125 | 0.39 | 0.39 |
| *Candida albicans* | >100 | >100 | >100 |
| *Sarcina lutea* | 0.0039 | 0.02 | |
| *Mycobacterium 607* | >100 | >100 | |
| *Mycobacterium berolinense* | >100 | >100 | 100 |
| *Streptococcus pyogenes* + serum | 0.0625 | 0.04 | |
| *Staphylococcus aureus* + serum | 0.125 | 0.19 | |
| *Staphylococcus aureus* + 0.1% nucleic acid | 0.39 | | |

The therapeutic value of these compounds is evident on comparison of their in vivo activity with that of phenoxymethylpenicillin against *S. aureus* infections in mice. The $PD_{50}$ values (50% curative or survival dose) for α-phenoxy-β-hydroxyethylpenicillin (A) α-phenoxy-β-acetoxyethylpenicillin (B) and phenoxymethylpenicillin (C), as their potassium salts, are given in Table II in terms of mg./kg.

TABLE II $PD_{50}$ Values of α-Phenoxy-β-Hydroxyethylpenicillin (A), α-Phenoxy-β-Acetoxyethylpenicillin (B) and Phenoxymethylpenicillin (C) Potassium Salts

| Penicillin | S. aureus 5 | | S. aureus 400 | |
|---|---|---|---|---|
| | Oral | Paren. | Oral | Paren. |
| α-phenoxy-β-hydroxyethyl | 1.5 | 1.5 | 290 | 50 |
| α-phenoxy-β-acetoxyethyl | 1.5 | <1.5 | >400 | >200 |
| Phenoxymethyl | 1.5 | 0.8 | >400 | >200 |

The activity of α-phenoxy-β-hydroxyethylpenicillin and its acetoxy derivative against the sensitive *S. aureus* strain number 5 is similar to that of the widely used phenoxymethylpenicillin. In contrast to phenoxymethylpenicillin, however, α-phenoxy-β-hydroxyethylpenicillin is surprisingly effective via oral, and particularly via parenteral, administration in the treatment of resistant *S. aureus* infections in animals including man. It should be noted that α-phenoxy-β-acetoxyethylpenicillin is also exceedingly antagonistic in vivo toward sensitive Staphylococci. The remaining compounds of this invention exhibit similar activity and have, therefore, the same utility. The 1-α-phenoxy-β-hydroxyethylpenicillin and 1-α-phenoxy-β-acetoxyethylpenicillin are more active than are the corresponding d-diastereoisomers. The l-diastereoisomers of the remaining products of this invention are more active than the d-diastereoisomers.

Further indication of the therapeutic value of α-phenoxy-β-hydroxyethylpenicillin is evident on comparison of its in vitro activity against various antibiotic resistant *S. aureus* cultures with that of benzylpenicillin. The minimum inhibitory concentrations are reported in Table III in terms of mcg./ml.

TABLE III

| Antibiotic Resistant S. aureus | α-Phenoxy-β-hydroxy-ethyl-penicillin | Benzyl Penicillin |
|---|---|---|
| 376 | 25 | 100 |
| 400 | 12.5 | 100 |
| P/r | 3.12 | 100 |
| M1 | 12.5 | 50 |
| M2 | 12.5 | 100 |
| M12 | 6.25 | 25 |
| M13 | 12.5 | 100 |

Oral administration of α-phenoxy-β-hydroxyethylpenicillin, α-phenoxy-β-acetoxyethylpenicillin and phenoxymethylpenicillin to dogs at dosage rates of 10 mg./kg. of body weight produce the following blood serum levels.

TABLE IV

Dog Blood Serum Levels (Mg./Ml.)

| Penicillin | Time (hours) | | | | |
|---|---|---|---|---|---|
| | 0.5 | 1.0 | 2.0 | 3.0 | 5.0 |
| α-Phenoxy-β-hydroxyethyl | 0.303 5/5 | 0.376 5/5 | 0.223 5/5 | 0.051 5/5 | 0.003 ¹5/5 |
| α-Phenoxy-β-acetoxyethyl | 2.303 4/4 | 2.220 4/4 | 1.363 4/4 | 0.415 4/4 | 0.071 2/4 |
| Phenoxymethyl | 1.201 5/5 | 1.020 5/5 | 0.490 5/5 | 0.097 5/5 | 0.001 1/5 |

¹ The ratios indicate the number of test animals which show a positive response.

Alpha-phenoxy-β-acetoxyethylpenicillin is thus absorbed to a much greater extent than its corresponding hydroxy compound and phenoxymethylpenicillin. This greater absorption, coupled with the previously mentioned in vivo activity of the acetylated product, makes this compound especially valuable for the treatment of a variety of bacterial infections in animals, including man. The remaining acylated products of this invention demonstrate similar properties.

The novel and valuable compounds of the present invention, are prepared by the reaction of 6-aminopenicillanic acid with (1) the appropriate acid chloride, or (2) the appropriate acid in the presence of a condensing agent, such as a carbodiimide, pentamethyleneketene cyclohexylamine and ethoxyacetylene. The diastereoisomers or mixtures thereof, of these valuable products are obtained by utilizing the appropriate form, for example the d-, l- or dl form, of the acid chloride or acid as reactant. The diastereoisomeric mixtures can, of course, be resolved into the individual diastereoisomers by suitable means such as fractional crystallization, selective extraction, or selective precipitation of an insoluble salt of one diastereoisomer in the presence of the other.

They can also be prepared by the method of Sheehan et al., Journal of the American Chemical Society, 81, 3089 (1959), which utilizes the reaction of D-penicillamine and t-butyl phthalimidomalonaldehydate as starting materials for a series of reactions. Substitution of the phenoxyacetyl chloride utilized by Sheehan et al., by, for example, α-phenoxy-β-hydroxypropionyl chloride in the reaction sequence produces α-phenoxy-β-hydroxyethylpenicillin potassium salt.

It is preferred to utilize the reaction of 6-aminopenicillanic acid with the appropriate acid chloride, for example, α-phenoxy-β-hydroxyalkanoyl chloride or α-phenoxy-β-acyloxyalkanoyl chloride in the presence of an acid acceptor at a neutral to moderately alkaline pH level, that is, at pH values of from about 6.0 to about 9.0 since this process produces substantial yields of the desired product.

The valuable compounds of this invention wherein $R_2$ is an acyl group are preferably prepared by reacting the appropriate α-phenoxy-β-acyloxyalkanoic acid or α-phenylmercapto-β-acyloxyalkanoic acid or acid chlorides thereof with 6-aminopenicillanic acid as described above. They can also be obtained by acylation of the proper α-phenoxy-β-hydroxyalkylpenicillin or α-phenylmercapto-β-hydroxyalkylpenicillin.

The required starting α-phenoxy-β-hydroxylalkanoic acids and α-phenylmercapto-β-hydroxyalkanoic acids are prepared by known methods. Alpha-phenoxy-β-hydroxy propionic acid, for example, is prepared by the acylation of an ester of phenoxyacetic acid, such as the ethyl ester, with ethylformate in the presence of sodium followed by reduction of the thus produced formyl ester to the β-hydroxyester. Replacement of ethyl formate by esters of alkanoic acids containing up to six carbon atoms produces the required α-phenoxy-β-hydroxy alkanoic acids. The α-phenylmercapto-β-hydroxyalkanoic acids are prepared in the same manner from α-phenylmercaptoacetic acid esters. Acylation of the β-hydroxy acids or esters with the appropriate acylating agent produces the corresponding β-alkanoxyloxy derivatives.

In addition to the α-phenoxy-β-hydroxyalkylpenicillins and α-phenylmercapto-β-hydroxyalkylpenicillins described herein, analogous compounds wherein the hydroxy group is further removed from the alpha-substituted carbon of the side chain also possess similar activity. Such activity is observed irrespective of whether the hydroxy group is a primary, secondary or tertiary hydroxy group.

When prepared as described above the novel antibiotics are obtained as the sodium or potassium salts. They are readily converted to the acid form by neutralization with a mineral acid, such as sulfuric or hydrochloric acids, or a suitable ion exchange resin and are recovered by extraction of their aqueous solution with a suitable water immiscible organic solvent.

The acid forms of the novel antibiotics of the present invention are, in turn, easily converted to salts by reaction with a suitable base. Thus, treatment of the desired antibiotic in aqueous solution with ammonium hydroxide produces the ammonium salt. In like manner other salts such as the calcium, magnesium, barium, potassium and sodium, are formed. In addition, amine salts, such as the procaine, dibenzylamine, N,N'-dibenzylethylenediamine, 1-ephenamine and N-benzyl-β-phenethylamine salts, are prepared by reacting a solution of the desired antibiotic in an aqueous or non-aqueous solvent with the desired amine. Alternatively, the amine salts are prepared in aqueous solution by reaction a metal salt of the desired antibiotic, e.g. the sodium salt, with the desired amine salt, for example, the amine hydrochloride salt.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

Fifty millimoles of dl-α-phenoxy-β-hyroxypropionic acid and 200 millimoles of thionyl chloride in 50 ml. of dioxane are refluxed for 4 hours and then evaporated under reduced pressure at 35–40° C. to remove excess thionyl chloride. Acetone (50 ml.) is added and the evaporation repeated. The residue is taken up in 100 ml. acetone and added dropwise to a solution of 50 millimoles of 6-aminopenicillanic acid in 250 ml. of 3% sodium bicarbonate and 100 ml. of acetone at 4° C. The pH is maintained at 7.5–8.0 by the addition of aqueous sodium hydroxide. After one hour, 100 ml. of water is added, the pH adjusted to 7.0 with aqueous phosphoric acid and the mixture extracted with an equal volume of ether. The aqueous layer is retained, adjusted to pH 2.5 with aqueous phosphoric acid and extracted twice with one volume of n-butanol. The combined n-butanol extracts are washed twice with 1/10 volume of water and then extracted with one-half volume of water, sufficient 5 N KOH being added to bring the pH to 6.5. The aqueous layer is freeze-dried to give a mixture of the potassium salts of d- and l-α-phenoxy-β-hydroxyethylpenicillin.

In like manner, but using the appropriate acid chloride, the following new penicillins are prepared as their potassium salts.

d-α-Phenoxy-β-hydroxyethylpenicillin
l-α-Phenoxy-β-hydroxyethylpenicillin

The d-α-phenoxy-β-hydroxypropionic acid is resolved from the dl-acid via its cinchronidine salt and purified by recrystallization from ethanol-water. The l-α-phenoxy-β-hydroxypropionic acid is isolated via its strychnine salt followed by recrystallization from tetrahydrofuran-ether.

EXAMPLE II

A solution of 0.201 g. of dl-α-phenoxy-β-hydroxypropionic acid in 10 ml. of tetrahydrofuran and a solution of 0.204 g. 1,3-dicyclohexylcarbodiimide in 5 ml. of tetrahydrofuran are added simultaneously to a solution of 0.216 g. of 6-aminopenicillanic acid in 20 ml. of water: tetrahydrofuran (1:1 containing sufficient sodium bicarbonate to give a clear solution. The mixture is stirred at room temperature for 3 hours, then diluted with water, filtered to remove 1,3-dicyclohexylurea and unreacted 1,3-dicyclohexylcarbodiimide. The filtrate is extracted with 20 ml. of ether, only the aqueous phase being maintained. The aqueous phase is then extracted with 3 x 50 ml. volumes of n-butanol at pH 2.0 and the combined n-butanol fractions washed once with water. The n-butanol phase is then extracted with 2 x 50 ml. portions of water, sufficient potassium hydroxide (6 N) solution being added to each portion during extraction to produce an aqueous extract of pH 7.0. The combined aqueous extracts are washed with 20 ml. of ether then freeze dried to give a mixture of the potassium salts of d- and l-α-phenoxy-β-hydroxyethylpenicillin.

EXAMPLE III

The procedure of Example II is repeated but using the appropriate acid in place of α-phenoxy-β-hydroxypropionic acid. The convenience only the side chain is listed. In each case a mixture of the stereoisomers is obtained.

| Penicillin | Penicillin |
| --- | --- |
| α-Phenoxy-β-hydroxy-n-propyl | α-Phenylmercapto-β-hydroxyethyl. |
| α-Phenoxy-β-hydroxy-n-butyl | α-Phenylmercapto-β-hydroxy-n-propyl. |
| α-Phenoxy-β-hydroxy-n-pentyl | α-Phenylmercapto-β-hydroxy-n-butyl. |
| α-Phenoxy-β-hydroxy-n-hexyl | α-Phenylmercapto-β-hydroxy-n-pentyl. |
| α-Phenoxy-β-hydroxy-n-heptyl | α-Phenylmercapto-β-hydroxy-n-hexyl. |
| α-Phenoxy-β-hydroxy-δ-methylpentyl | α-Phenylmercxpto-β-hydroxy-n-heptyl. |
| α-Phenoxy-β-hydroxy-β-methylhexyl | α-Phenylmercapto-β-hydroxy-δ-methylpentyl. |
| α-Phenoxy-β-hydroxy-δ,δ-dimethylpentyl | α-Phenylmercapto-β-hydroxy-α-methylbutyl. |

EXAMPLE IV

The procedure of Example II is repeated but using nitromethane as extracting solvent in place of n-butanol. The nitromethane solution is washed with water, dried with anhydrous sodium sulfate, then titrated to pH 7 with 20% potassium hydroxide in methanol. Fifty ml. of 1:1 benzene-ethanol is added and the solution evaporated under reduced pressure until 60 ml. of distillate is collected. After one hour at room temperature, the residue is filtered to give crystalline potassium α-phenoxy-β-hydroxyethylpenicillin predominantly as the l-diastereoisomer.

EXAMPLE V

Repetition of the procedure of Example IV but using methylethylketone in place of nitromethane produces a crystalline product consisting mostly of d-α-phenoxy-β-hydroxyethylpenicillin potassium salt.

EXAMPLE VI 5 g. of dl-α-phenoxy-β-hydroxypropionic acid is refluxed for one-half hour with 10 ml. of acetic anhydride. The excess acetic anhydride is removed under reduced pressure and the residue distilled; B.P. 165° C. at 0.4 mm.

The acetylated product is then reacted with 6-aminopenicillanic acid according to the procedure of Example II to give a mixture of the potassium salts of d- and l-α-phenoxy-β-acetoxyethylpenicillin.

Repetition of this procedure using the d- and l-isomers of α-phenoxy-β-hydroxypropionic acid and of α-phenylmercapto-β-hydroxypropionic acid with the anhydrides of acetic, propionic and butyric acids produces the respective O-acylated derivatives of d- and l-α-phenoxy-β-hydroxyethylpenicillin and α-phenylmercapto-β-hydroxyethylpenicillin as their potassium salts.

EXAMPLE VII 3 g. of dl-α-phenoxy-β-hydroxypropionic acid is refluxed one-half hour with 5 ml. of acetyl chloride. Thionyl chloride (5 ml.) is added, the mixture refluxed for one hour then distilled in vacuo, the fraction boiling at 140° C. at 0.35 mm. being collected.

The α-phenoxy-β-acetoxypropionylchloride thus obtained is reacted with 6-aminopenicillanic acid according to the procedure of Example I to give a mixture of the potassium salts of d- and l-α-phenoxy-β-acetoxyethylpenicillin. The product is identical to the product of Example VI.

EXAMPLE VIII

The procedure of Example VI is repeated using the appropriate α-phenoxy-β-hydroxyalkanoic acid and α-phenylmercapto-β-hydroxyalkanoic acid with the desired acylating agent. In this manner, the formyl, acetyl, propionyl and butyryl derivatives of the products of Example III are obtained as their potassium salts.

EXAMPLE IX

The products of the preceding examples are converted to their free acid forms by neutralization of the aqueous solutions of their potassium salts with 6 N hydrochloric acid to pH 2.2. The acids are recovered by extraction into methylisobutylketone followed by evaporation of the solvent.

EXAMPLE X

The free acids of Example IX are transformed to their sodium, calcium, ammonium, procaine, N,N'-dibenzylethylenediamine, dibenzylamine, l-ephenamine, N-benzyl-β-phenethylamine, benzimidazole, 2,5-diphenylpiperazine and benzhydrylamine salts by neutralization of aqueous solutions thereof with a stoichiometric amount of the appropriate base. The salts are recovered by freeze drying.

What is claimed is:

1. A compound selected from the group consisting of the stereoisomers and mixtures thereof of compounds represented by the formula:

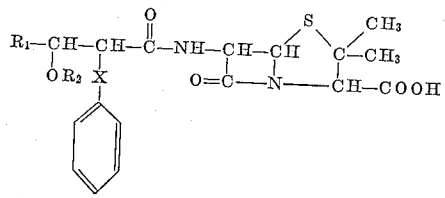

and the pharmaceutically acceptable salts thereof wherein X is selected from the group consisting of oxygen and sulfur; $R_1$ is selected from the group consisting of hydrogen and alkyl containing 1 to 5 carbon atoms; $R_2$ is selected from the group consisting of hydrogen and acyl radical of a hydrocarbon monocarboxylic acid containing 1 to 4 carbon atoms.

2. The potassium salt of d-α-phenoxy-β-hydroxyethylpenicillin.

3. The potassium salt of l-α-phenoxy-β-hydroxyethylpenicillin.

4. The sodium salt of l-α-phenoxy-β-hydroxyethylpenicillin.

5. l-α-Phenoxy-β-hydroxyethylpenicillin.

6. The potassium salt of l-α-phenoxy-β-acetoxyethylpenicillin.

7. The potassium salt of l-α-phenylmercapto-β-hydroxyethylpenicillin.

8. The potassium salt of l-α-phenoxy-β-hydroxy-n-propylpenicillin.

References Cited in the file of this patent

UNITED STATES PATENTS

| | | |
|---|---|---|
| 2,479,295 | Behrens et al. | Aug. 16, 1949 |
| 2,479,296 | Behrens et al. | Aug. 16, 1949 |
| 2,479,297 | Behrens et al. | Aug. 16, 1949 |
| 2,941,995 | Doyle et al. | June 21, 1960 |

FOREIGN PATENTS

| | | |
|---|---|---|
| 569,728 | Belgium | Nov. 15, 1958 |

UNITED STATES PATENT OFFICE
CERTIFICATE OF CORRECTION

Patent No. 3,116,285            December 31, 1963

Walter D. Celmer et al.

It is hereby certified that error appears in the above numbered patent requiring correction and that the said Letters Patent should read as corrected below.

Column 1, lines 49 to 57, for that portion of the formula reading

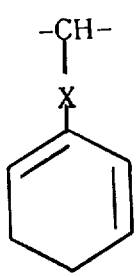      read      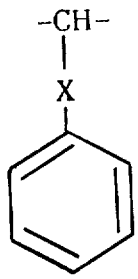

column 3, TABLE IV, sixth column, line 2 thereof, for "$1_5/5$" read -- $1_1/5$ --; column 6, line 16, for "The" read -- For --.

Signed and sealed this 16th day of June 1964.

(SEAL)
Attest:

ERNEST W. SWIDER
Attesting Officer

EDWARD J. BRENNER
Commissioner of Patents